United States Patent [19]

Hildebrandt et al.

[11] Patent Number: 5,175,061
[45] Date of Patent: Dec. 29, 1992

[54] HIGH-TEMPERATURE FUEL CELLS WITH OXYGEN-ENRICHED GAS

[75] Inventors: Ulrich Hildebrandt, Pullach; Walter Schramm, Munich, both of Fed. Rep. of Germany

[73] Assignee: Linde Aktiengesellschaft, Wiesbaden, Fed. Rep. of Germany

[21] Appl. No.: 514,462

[22] Filed: Apr. 25, 1990

[30] Foreign Application Priority Data

Apr. 25, 1989 [DE] Fed. Rep. of Germany ....... 3913580
Sep. 27, 1989 [DE] Fed. Rep. of Germany ....... 3932217

[51] Int. Cl.⁵ .................................. H01M 8/06
[52] U.S. Cl. .................................. 429/16; 429/17; 429/19; 429/20
[58] Field of Search ................. 429/16, 17, 20, 19

[56] References Cited

U.S. PATENT DOCUMENTS

| | | | |
|---|---|---|---|
| 3,532,547 | 10/1970 | Vahldieck et al. | 429/17 |
| 4,595,642 | 6/1986 | Nakanishi et al. | 429/20 |
| 4,792,502 | 12/1988 | Trocciola | 429/19 |
| 4,921,765 | 5/1990 | Gmeindl et al. | 429/16 |

FOREIGN PATENT DOCUMENTS 69775 6/1981 Japan .

OTHER PUBLICATIONS

James A. Kent, editor, Riegel's Handbook of Industrial Chemistry, Seventh Edition, Van Nostrand and Reinhold Company, New York, 1974, p. 521.
Springmann, H., "Oxygen Enrichment of Air in Combustion and Gasification Processes", *Linde Reports on Science and Technology,* 34/1982, pp. 54–63.
Koch, H., "Auslegung von Heissgas-Umwälzventiltoren", Fachberichte Hüttenpraxis, Mettallweiter-Weiterverarbeitung, 22 (1984), No. 3, 188–195.

*Primary Examiner*—Olik Chaudhuri
*Assistant Examiner*—M. Nuzzolillo
*Attorney, Agent, or Firm*—Millen, White, Zelano and Branigan

[57] ABSTRACT

In high-temperature fuel cells based on an ion-conducting electrolyte, wherein hydrogen and oxygen are converted into water, the cathode of the fuel cell is supplied with oxygen-enriched gas from an air separator, preferably a cryogenic air separator. This oxygen-enriched gas is supplied together with a $CO_2$-containing gas in a stoichiometric $O_2/CO_2$ ratio.

For the recovery of the $O_2$ and $CO_2$ components, a partial stream of the cathode outlet gas is recycled; for this purpose, the cathode outlet gas, used for regulating the fuel cell temperature, is cooled with production and/or superheating of steam and recompressed by means of a hot gas blower or a hot gas compressor.

3 Claims, 1 Drawing Sheet

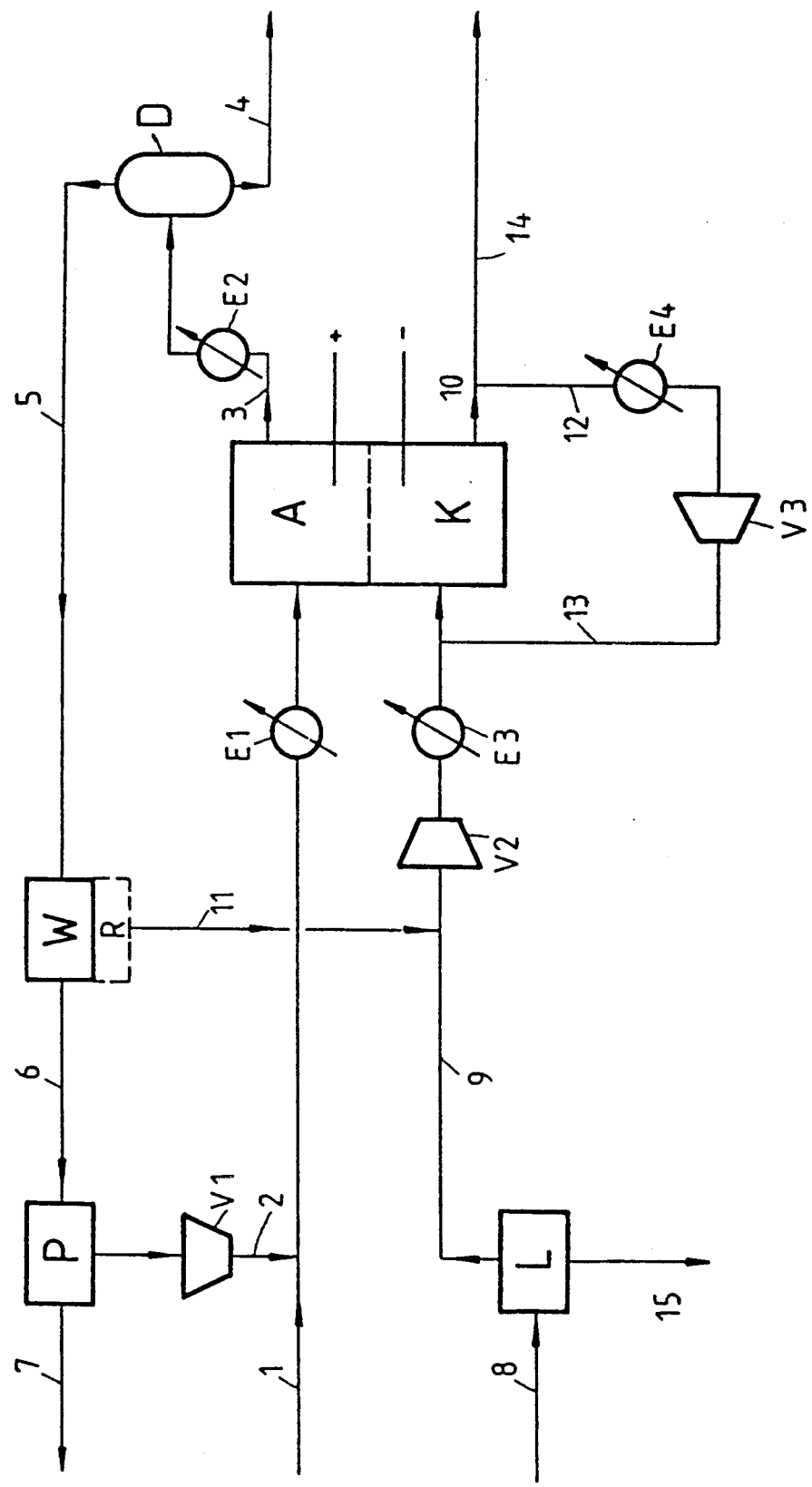

HIGH-TEMPERATURE FUEL CELLS WITH OXYGEN-ENRICHED GAS

CROSS-REFERENCE TO RELATED APPLICATION

This application is related to co-inventor Walter Schramm's concurrently filed application entitled "Fuel Cells with Hydrogen Recycle", application Ser. No. 07/514,459, now U.S. Pat. No. 5,079,103, issued Jan. 7, 1992.

BACKGROUND OF THE INVENTION

The invention relates to a method and apparatus for operating high-temperature fuel cells with ion-conducting electrolyte wherein hydrogen and oxygen-containing ions are converted to water with the production of electrical power, and with oxygen in the form of an oxygen-containing gas being supplied to the cathode of the fuel cell.

German Application P 38 10 113 discloses a process for operating fuel cell systems. The feedstock therein is a fuel gas, for example a gas from a partial oxidation, town gas, or natural gas which is converted, in a synthesis gas generator with the addition of steam, into an $H_2/CO$ synthesis gas. This synthesis gas is subjected to a CO conversion, and the thus-formed $H_2$ fuel gas is fed to the anode side of the fuel cell.

The cathode is supplied with a mixture of carbon dioxide and air. During this process, $CO_3^{2-}$ ions are formed from oxygen and carbon dioxide at the cathode; these ions diffuse through the ion-conducting electrolyte and are converted to water and carbon dioxide at the anode with hydrogen. It has been found that the nitrogen in the air passed into the cathode covers parts of the cathode due to polarization. This results in a decrease in the conversion of $CO_2$ and $O_2$ to $CO_3^{2-}$ ions and a concomitant reduction in the efficiency of the cell. In addition, from the cathode, an outlet gas is generally withdrawn containing unreacted components and inert components, a portion of which is returned to the cathode after cooling, compression and reheating, in order to regulate the temperature of the fuel cell. When using a $CO_2$-air mixture, an outlet gas primarily containing nitrogen will then be obtained at the cathode, and owing to the recycling procedure, this gas dilutes the effective oxygen and carbon dioxide proportions supplied to the cathode side, the dilution being evident even at the inlet to the cathode. Finally, the required removal of the nitrogen results in a large waste gas stream, and $CO_2$ valuable for the process is, perforce, lost with this waste gas stream.

SUMMARY OF THE INVENTION

It is an object of the invention to provide a method and apparatus for operating a fuel cell system which avoids the disadvantages of the state of the art.

Upon further study of the specification and appended claims, further objects and advantages of this invention will become apparent to those skilled in the art.

To attain these objects, an oxygen-enriched gas from an air separator is supplied to the cathode of the fuel cell.

An air separator, in this context, is understood to mean all types of devices by means of which an oxygen-enriched gas can be obtained, for example: by membrane, adsorption, or low-temperature rectification.

Advantageously, a nitrogen-depleted oxygen stream is thus made available so that polarization and covering of the cathode is substantially eliminated. It is preferable that the resultant oxygen enriched stream contain less than 5, especially less than 0.5% by volume of nitrogen.

Since no nitrogen at all, or only a small quantity of nitrogen, needs to be discharged, a far lower proportion of $CO_2$ is lost than in the above-described prior art systems.

In one embodiment of the invention, oxygen-enriched gas from a conventional low-temperature air separator is fed to the fuel cell. As compared with the air separation systems based on membrane and adsorption techniques, low-temperature air separation is preferred since this process yields high product purity in contrast to the membrane technique, and also is capable of providing large amounts of oxygen-enriched gas more efficiently, energy-wise, than the adsorption technique. Especially in connection with large fuel cell arrangements, the advantage of lower operating expenses resulting from an improvement in the efficiency of the cell more than offsets the somewhat higher initial investment costs for a low-temperature air separation system. Large fuel cell arrangements are characterized in an oxygen consumption exceeding 100 kg/l. For a description of low temperature (cryogenic) air separation systems preferred for the present invention, reference is invited to H. Springmann, *Linde Reports on Science and Technology* (1982) No. 34, 54–63.

In a further development of this invention, an oxygen-enriched gas and a $CO_2$-containing gas are supplied together to the cathode in a stoichiometric $O_2/CO_2$ ratio. For this purpose, a gaseous stream of high $CO_2$ content is admixed, for example, to the oxygen-enriched gas, this gaseous stream being obtained during the processing of the anode outlet gas. The provision of a stoichiometric $O_2/CO_2$ ratio in the gas fed to the cathode has the advantage that the cathode outlet gas also exhibits a stoichiometric $O_2/CO_2$ ratio whereby ideal conversion conditions are created at the cathode.

The recycling of cathode outlet gas to the gas feed conduit at a point upstream of the cathode has the advantage that the fuel cell can be cooled by this circulation, and that simultaneously the utilization of $O_2$ and $CO_2$ is enhanced, particularly in case of a high oxygen content, e.g., at least 95, especially at least 99.5% by volume of $O_2$, in the oxygen-enriched gas. In the extreme case, substantially the entire cathode outlet gas can be recycled, meaning minimum losses of $CO_2$ and $O_2$.

Furthermore, the recycled portion of the cathode outlet gas, prior to being admixed to the oxygen-enriched gas feed, is compressed by pressurizing means, e.g., a hot gas compressor or a hot gas blower. Such hot gas blowers are described in H. Koch, Fachberichte Hüttenpraxis, Metallweiter verarbeitung, 22, (1984) No. 3, 188–195.

The cathode outlet gas leaving the cathode chamber has a lower pressure than the gas at the cathode inlet. The recycled partial stream is at even a lower pressure and must be recompressed because of the pressure loss during cooling of the partial stream in a heat exchanger for the purpose of cooling the fuel cell, and because of pressure losses in the conduits. With the use of a conventional compressor, the waste gas would have to be cooled down initially to a low compressor operating temperature, e.g., about 50° to 200° C., and compressed gas would have to be reheated. Thereby valuable heat would be lost.

In contrast thereto, with the use of a hot gas compressor or hot gas blower which can handle gases at temperatures up to 600° C., this expensive step is advantageously eliminated and, moreover, the entire heat given off by the recycle stream can be utilized at a temperature higher than the compression or blower inlet temperature.

The use of this invention is not limited to fuel cells with hydrogen fuel gas feed but rather is likewise suggested for fuel cells with internal reforming. As is known, such internal reforming fuel cells are charged with a mixture of hydrocarbon feedstocks (e.g., natural gas, etc.) and steam, and in the anode chamber, by the utilization of the heat developed by the fuel cell, the requisite hydrogen is produced for the conversion reaction.

BRIEF DESCRIPTION OF THE DRAWING

The FIGURE is a schematic representation of a preferred comprehensive embodiment of the invention and in the following detailed description, concentrations are indicated in mol-%.

DETAILED DESCRIPTION OF THE DRAWING

By way of conduit 1, a hydrogen fuel gas originating from a steam reformer with a downstream CO conversion stage and having the composition set forth below is mixed with an $H_2$ recycle stream 2:

| | |
|---|---|
| $H_2$ | 63.5% |
| CO | 4.5% |
| $CH_4$ | 1.7% |
| $CO_2$ | 13.2% |
| $H_2O$ | 17.6% |

In heat exchanger E1, this mixed stream is heated to the fuel cell operating temperature of, for example, 600° C., and supplied to the anode side A. An anode outlet gas 3 is obtained. This waste gas is cooled in heat exchanger E2, thus partially condensing water contained therein which is separated in separator D and discharged via conduit 4. The anode outlet gas 5, now extensively freed of water, has a composition of:

| | |
|---|---|
| $H_2$ | 24.2% |
| CO | 4.6% |
| $CH_4$ | 1.6% |
| $CO_2$ | 69.0% |
| $H_2O$ | 0.6% | and is subjected, for further processing, to a scrubbing step in a scrubber W for $CO_2$ removal. The anode outlet gas 6, extensively freed of $CO_2$, is further purified in a pressure swing adsorption unit P to obtain hydrogen. Residual gas 7 which is thus produced is passed on to the reformer heating unit. The hydrogen obtained in the pressure swing adsorption unit is recompressed in compressor V1 as an $H_2$ recycle stream 2 to the pressure of the $H_2$ fuel gas, and admixed to the $H_2$ fuel gas. Oxygen-enriched gas 9 is supplied to the cathode side K of the fuel cell. This oxygen-enriched gas is obtained from air 8 fractionated in a low-temperature air separation unit L and is composed of:

| | |
|---|---|
| $O_2$ | 99.5% |
| Ar | 0.4% |
| $N_2$ | 0.1% |

A $CO_2$ rich gas having a $CO_2$ content of almost 100% is admixed to this stream upstream of the cathode.

$CO_2$ stream 11 is obtained from a conventional regeneration facility R for regenerating the scrubbing medium used in the scrubber W. After admixture of the $CO_2$ stream, the oxygen-enriched gas is compressed in compressor V2 to the operating pressure of the fuel cell of, for example, 8.0 bar and is heated in heat exchanger E3 approximately to fuel cell temperature, and combined with recycled cathode waste gas 13.

A gas stream 10 is removed from the cathode outlet and a partial stream 12 of this gas stream is branched off. This partial stream is cooled in heat exchanger E4 operating at a high temperature, i.e., for example with production and/or superheating of steam at a temperature of 450° to 600° C., and then compressed in hot gas compressor V3 to the pressure of the fuel cell before it is admixed to the cathode feed gas.

In this specific embodiment, an efficiency of the cell of almost 80% can be attained. In the remaining waste gas stream 14 amounting to about 1 to 10% of the cathode outlet gas, all inert gases introduced into the cathode, such as, for example, argon and nitrogen, are withdrawn. The residual gas 15 of the air separator L, nitrogen, can be beneficially utilized somewhere else, for example for external use or as inert gas required for start-up and shut-down of the fuel cell plant.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above, and of corresponding applications Federal Republic of Germany P 39 13 580.2, filed Apr. 25, 1989 and Federal Republic of Germany P 39 32 217.3, filed Sep. 27, 1989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method of operating a high-temperature fuel cell with an ion-conducting electrolyte wherein hydrogen and oxygen-containing ions are converted to water with production of electrical power, oxygen being supplied to the cathode of the fuel cell in the form of an oxygen-containing gas, said oxygen-containing gas being mixed with a $CO_2$-containing gas before being fed to the cathode, the improvement wherein the oxygen-containing gas is by volume at least 99.5% oxygen, and further comprising withdrawing a cathode exhaust gas containing oxygen and $CO_2$ from said cathode, cooling at least a part of the cathode exhaust gas, compressing resultant cooled exhaust gas to about the pressure of the cathode chamber, and employing resultant cooled and compressed cathode exhaust gas at least partially as said $CO_2$- and oxygen-containing gas, thereby recycling said cathode exhaust gas at least partially to said cathode.

2. A method according to claim 1, further comprising subjecting air to low-temperature air separation and utilizing resultant oxygen-enriched fraction as said oxygen-containing gas.

3. A method according to claim 2, said oxygen-enriched gas and a said $CO_2$-containing gas in a stoichiometric $O_2/CO_2$ ratio is fed to the cathode.

* * * * *